(12) United States Patent
Debusmann (10) Patent No.: US 9,430,253 B2
(45) Date of Patent: Aug. 30, 2016

(54) REUSABLE AND LATE ADDITION ENABLED XML DATA BINDING (75) Inventor: Ralph Debusmann, Ludwigsburg (DE)

(73) Assignee: SAP SE, Walldorf (DE)

( * ) Notice: Subject to any disclaimer, the term of this patent is extended or adjusted under 35 U.S.C. 154(b) by 1375 days.

(21) Appl. No.: 13/244,646

(22) Filed: Sep. 25, 2011

(65) Prior Publication Data

US 2013/0080875 A1   Mar. 28, 2013

(51) Int. Cl.
G06F 9/445 (2006.01)
G06F 17/30 (2006.01)
G06F 17/22 (2006.01)

(52) U.S. Cl.
CPC ....... G06F 9/44521 (2013.01); G06F 17/2247 (2013.01); G06F 17/30914 (2013.01)

(58) Field of Classification Search
CPC ............... G06F 17/30914; G06F 9/44521; G06F 17/2247
USPC ...................................................... 715/234
See application file for complete search history.

(56) References Cited

U.S. PATENT DOCUMENTS

| 7,120,863 B1 * | 10/2006 | Wang ............................ 715/227 |
| 2003/0163603 A1 | 8/2003 | Fry et al. | |
| 2004/0107183 A1 | 6/2004 | Mangan | |
| 2004/0168128 A1 * | 8/2004 | Friedman et al. ............. 715/530 |
| 2004/0205174 A1 * | 10/2004 | Snyder et al. ................ 709/223 |
| 2004/0216086 A1 * | 10/2004 | Bau ................................ 717/114 |
| 2005/0108627 A1 * | 5/2005 | Mireku ........................ 715/513 |
| 2006/0195454 A1 | 8/2006 | Davis et al. | |
| 2007/0244912 A1 | 10/2007 | Kawaguchi | |
| 2008/0127153 A1 | 5/2008 | Liu | |
| 2009/0248730 A1 | 10/2009 | Burns | |
| 2009/0327238 A1 | 12/2009 | Leece et al. | |
| 2011/0161983 A1 | 6/2011 | Brandow et al. | |

FOREIGN PATENT DOCUMENTS

WO   WO 02063438 A2 *   8/2002

* cited by examiner

*Primary Examiner* — Cesar Paula
*Assistant Examiner* — Tyler J Schallhorn (57) ABSTRACT Various embodiments of systems and methods for reusable and late addition enabled XML data binding are described herein. A computer receives an element class that is created for a non-atomic class. The element class comprises a first constructor, a decomposer that returns data extracted from an object for an entity to aid in serialization, and a composer that extracts value of the entity and creates a new instance of the non-atomic class using the extracted value to aid in de-serialization. The object is of type non-atomic class. The computer also receives an attribute class that is created for an atomic class to which the non-atomic class refers to. The attribute class comprises a second constructor, a serializer, and a de-serializer. The computer then generates an XML document using the element class and the attribute class.

15 Claims, 5 Drawing Sheets

REUSABLE AND LATE ADDITION ENABLED XML DATA BINDING

FIELD

The field relates generally to Extensible Markup Language (XML) data binding. More particularly, the field relates to an XML data binding approach that is reusable and enables late addition of data binding.

BACKGROUND

It is often required to transform memory representations of data such as objects (of object oriented programming) into an XML document. The process of transforming data into an XML document is called "marshalling" or "serialization" and the process of transforming an XML document back into data is called "un-marshalling" or "de-serialization." XML data binding approaches are used for serialization and de-serialization.

Several approaches for XML data binding are known in the art. These approaches can be categorized into procedural approaches and declarative approaches. Procedural approaches provide flexibility in serialization and de-serialization. They are suitable for late addition of data binding to existing projects. However, procedural approaches require writing of code, which can be a complicated and expensive way to add support for data binding. Also, the code for serialization and de-serialization may not be easily reused for other projects.

Declarative approaches follow the class generation metaphor, i.e. classes and interfaces for serialization and de-serialization are first generated from document type definitions (e.g., with XML Schema). The classes generated from the document type definitions then contain both the code for serializing and de-serializing the corresponding object instances. An advantage of this approach is that there is no need to write a code to add support for data binding, as it is only necessary to declaratively define a document type. The same approach may be re-used for a new project—only a new XML document type is required for each new class.

However, in declarative approaches, it is difficult to add support for data binding for existing projects. The existing classes first have to be transformed into XML document types because only then these XML document types can be compiled into classes and interfaces that are required for serialization and de-serialization. Also, after serialization, the existing classes have to be mapped to the generated classes, and after de-serialization, the generated classes have to be mapped back to the original ones. Even for new projects where classes to be serialized can be derived from XML document type definitions, a developer should be well versed with XML document type definition language and it may not be easy to achieve a good mapping.

It would therefore be desirable to have both late addition functionality and reusability for XML data binding.

SUMMARY

Various embodiments of systems and methods for reusable and late addition enabled XML data binding are described herein. A computer receives an element class that is created for a non-atomic class. The element class comprises a first constructor, a decomposer that returns data extracted from an object for an entity to aid in serialization, and a composer that extracts value of the entity and creates a new instance of the non-atomic class using the extracted value to aid in de-serialization. The object is of type non-atomic class. The computer also receives an attribute class that is created for an atomic class to which the non-atomic class refers to. The attribute class comprises a second constructor, a serializer, and a de-serializer. The computer then generates an XML document using the element class and the attribute class.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for reusable and late addition enabled XML data binding are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
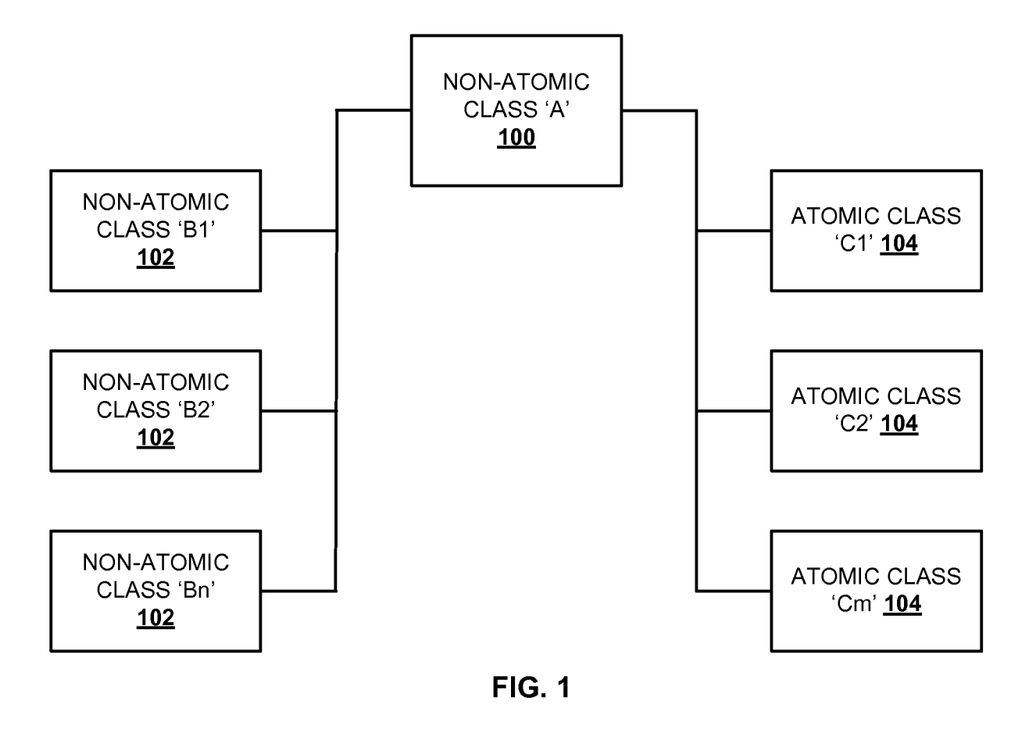
FIG. 1 is a block diagram showing types of classes in a program code written in an object-oriented programming language, according to one embodiment.

FIG. 1 is a block diagram showing types of classes in a program code written in an object-oriented programming language such as, for example, JAVA. The program code can be part of an existing JAVA project. The program code includes atomic and non-atomic classes. A non-atomic class 'A' 100 can refer to one or more non-atomic classes 102 '$B_1$, $B_2$ . . . and $B_n$.' The non-atomic class 'A' 100 also refers to one or more atomic classes 104 '$C_1$, $C_2$ . . . and $C_n$.' An atomic class 104 is a class that is represented by a non-nested string. A non-atomic class 100, 102 is a class that is represented by a nested string. The following is an example of a JAVA code that includes non-atomic and atomic classes:

```
public class Player {
    private String firstName;
    private String lastName;
    private int age;
    private Participation[ ] participations;
    public Player(String firstName, String lastName, int age,
            Participation[ ] participations) {
        this.firstName = firstName;
        this.lastName = lastName;
        this.age = age;
        this.participations = participations;
    }
    public String getFirstName( ) {
        return firstName;
    }
    public String getLastName( ) {
        return lastName;
    }
    public int getAge( ) {
        return age;
    }
    public Participation[ ] getParticipations( ) {
        return participations;
    }
}
```

The above program code is a JAVA class PLAYER. The PLAYER class is a non-atomic class as it is represented by nested strings. The PLAYER class models a football player with a first name, a last name, an age, and number of participations in tournaments. The PLAYER class refers to two atomic classes, namely, a STRING class and an INT class. STRING and INT classes are represented using a simple, non-nested string. The PLAYER class also refers to a non-atomic class PARTICIPATION. The PARTICIPATION class is presented below:

```
public class Participation {
    private String tournament;
    private int matches;
    private int goals;
    public Participation(String tournament, int matches, int goals) {
        this.tournament = tournament;
        this.matches = matches;
        this.goals = goals;
    }
    public String getTournament( ) {
        return tournament;
    }
    public int getMatches( ) {
        return matches;
    }
    public int getGoals( ) {
        return goals;
    }
}
```

The PARTICIPATION class is represented by nested strings. The PARTICIPATION class models participation in a tournament by the number of matches played in the tournament and the number of goals scored in the tournament. The PARTICIPATION class also refers to atomic classes STRING and INT.

Figure 2:
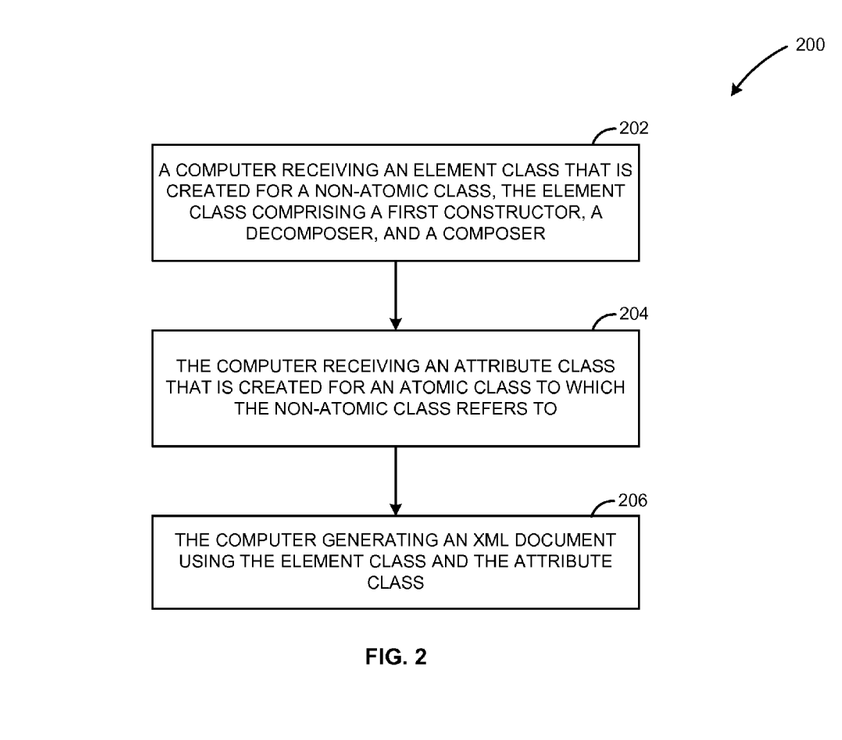
FIG. 2 illustrates a method for Extensible Markup Language (XML) data binding according to one embodiment.

FIG. 2 illustrates a method 200 for Extensible Markup Language (XML) data binding for an object-oriented programming language such as JAVA. The method is explained with reference to JAVA. The process of transforming data such as JAVA objects into an XML document is called "serialization" or "marshalling" and the process of transforming an XML document back into JAVA data is called "de-serialization" or "un-marshalling." The data binding approach specific to JAVA and XML can be called as JAVA-to-XML data binding.

At 202, a computer receives an element class. The element class is created for a non-atomic class. Considering the example of PLAYER class, an element class "PLAYER-ELEMENT" is created for the PLAYER class. An embodiment of the PLAYER-ELEMENT class is presented below:

```
//First constructor
public class PlayerElement extends SingleElement {
    private EmptySingleElement nameElement;
    private EmptySingleElement ageElement;
    private ListElement participationsElement;
    public PlayerElement( ) {
        super("player",
        new Attribute[0],
        new Element[ ]{
            new EmptySingleElement (
                "name",
                new StringAttribute("first", true),
                new StringAttribute("last", true)),
            new EmptySingleElement (
                "age",
                new IntegerAttribute("value", true)),
            new ListElement(
                "participations",
                new ParticipationElement( ))});
        this.nameElement =
            (EmptySingleElement) getDaughterElements( )[0];
        this.ageElement =
            (EmptySingleElement) getDaughterElements( )[1];
        this.participationsElement =
            (ListElement) getDaughterElements( )[2];
    }
//Decomposer
    public Object decompose(Object obj, Entity entity) {
        Object returnObj = null;
        if (obj != null) {
            Player player = (Player) obj;
            if (entity.equals(nameElement)) {
                returnObj =
                    new Object[ ]{
                        player.getFirstName( ),
                        player.getLastName( )};
            } else if (entity.equals(ageElement)) {
                returnObj = player.getAge( );
            } else if (entity.equals(participationsElement)) {
                returnObj = player.getParticipations( );
            }
        }
        return returnObj;
    }
//Composer
    public Object compose(Map<Entity, Object> entityObjMap) {
        Object[ ] nameObjs =
            (Object[ ]) entityObjMap.get(nameElement);
        String firstName =
            (String) nameObjs[0];
        String lastName =
            (String) nameObjs[1];
        int age =
            (Integer) entityObjMap.get(ageElement);
        Object[ ] participationObjs =
            (Object[ ])
            entityObjMap.get(participationsElement);
        Participation[ ] participations =
            new Participation[participationObjs.length];
        for (int i = 0; i < participationObjs.length; i++) {
            participations[i] =
                (Participation) participationObjs[i];
        }
        Player player =
            new Player(firstName, lastName, age,
                participations);
        return player;
    }
}
```

The element class includes a first constructor, a decomposer, and a composer. The first constructor is used to create the PLAYER-ELEMENT with a plurality of sub-elements. The sub-elements include a "name" sub-element, an "age" sub-element, and a "participation" sub-element. The PLAYER-ELEMENT does not include any attributes. The "name" sub-element is an empty single element because it does not include any sub-elements. The "age" sub-element is an empty single element with the attribute "value" of type INT. The "participation" sub-element is a list element that includes one or more elements of type PARTICIPATION-ELEMENT. As will be described below, the PARTICIPATION-ELEMENT is an element class created for the PARTICIPATION class that is referred by the PLAYER class.

The decomposer is a decompose method that gets an object of type PLAYER and an entity and returns the data extracted from the object PLAYER for the given entity. The entity can be an attribute or a sub-element and there can be more than one entity. When an entity is the "name" sub-element, then the decomposer returns the first name and last name of the player (player.getFirstName( ) and player.getLastName( )). Similarly, when an entity is the "age" sub-element, then the decomposer returns the age (value) of the player (player.getAge( )). The decomposer aids in serializing JAVA objects of type PLAYER to an XML document. The actual serializing code is hidden in the super class ELEMENT. This serializing code is included in a JAVA-to-XML data binding package or Application Programming Interface (API) embodying this method 200 and need not be written by an end user who wants to serialize JAVA data.

For de-serialization, the XML document is first parsed using an XML parser. In one embodiment, Streaming API for XML (StAX) parsing is used for parsing the XML document. The composer is a compose method that first gets a mapping of entities to objects after parsing the XML document. The composer then extracts the values of the entities and creates a new instance of PLAYER class. In the above example, the composer extracts the values of the following entities: the "name" sub-element, the "age" sub-element, and the "participation" sub-element. The composer aids in de-serializing an XML document into JAVA objects of type PLAYER. The actual de-serializing code and XML parsing is hidden in the super class ELEMENT. The de-serializing code and XML parsing are included in a JAVA-to-XML data binding package embodying this method 200.

Since the PLAYER class refers to a non-atomic PARTICIPATION class, a PARTICIPATION-ELEMENT class is also created at 202. An embodiment of the PARTICIPATION-ELEMENT class is presented below:

```
//First constructor
public class ParticipationElement extends SingleElement {
    private StringAttribute tournamentAttribute;
    private IntegerAttribute matchesAttribute;
    private IntegerAttribute goalsAttribute;
    public ParticipationElement( ) {
        super(
        "participation",
        new Attribute[ ]{
            new StringAttribute("tournament", true),
            new IntegerAttribute("matches", true),
            new IntegerAttribute("goals", false)});
        this.tournamentAttribute =
            (StringAttribute) getAttributes( )[0];
        this.matchesAttribute =
            (IntegerAttribute) getAttributes( )[1];
        this.goalsAttribute =
            (IntegerAttribute) getAttributes( )[2];
```

-continued

```
    }
//Decomposer
    public Object decompose(Object obj, Entity entity) {
        Object returnObj = null;
        if (obj != null) {
            Participation participation = (Participation) obj;
            if (entity.equals(this.tournamentAttribute)) {
                returnObj = participation.getTournament( );
            } else if (entity.equals(this.matchesAttribute)) {
                returnObj = participation.getMatches( );
            } else if (entity.equals(this.goalsAttribute)) {
                returnObj = participation.getGoals( );
            }
        }
        return returnObj;
    }
//Composer
    public Object compose(Map<Entity, Object> entityObjMap) {
        String tournament =
            (String) entityObjMap.get(tournamentAttribute);
        int matches =
            (Integer) entityObjMap.get(matchesAttribute);
        int goals =
            (Integer) entityObjMap.get(goalsAttribute);
        Participation participation =
            new Participation (tournament, matches, goals);
        return participation;
    }
}
```

The PARTICIPATION-ELEMENT class also includes a first constructor, a decomposer, and a composer. The first constructor is used to create the PARTICIPATION-ELEMENT with one or more entities. In this case the entities include three attributes, namely, a "tournament" attribute, a "matches" attribute, and a "goals" attribute.

The decomposer is a decompose method that gets an object of type PARTICIPATION and an entity and returns the data extracted from the PARTICIPATION object for the given entity. For a given tournament, matches, and goals entities, tournament name, number of matches, and number of goals are extracted (e.g., participation.getTournament ( ), participation.getMatches ( ), and participation.getGoals ( )).

After parsing the XML document, the composer extracts the values of the "tournament" attribute, the "matches" attribute, and the "goals" attribute and creates a new instance of PARTICIPATION class. The decomposer aids in serializing JAVA objects of type PARTICIPATION to an XML document and the composer aids in de-serializing an XML document into JAVA objects of type PARTICIPATION. As cited previously, the actual serializing code, the actual de-serializing code, and XML parsing are included in a JAVA-to-XML data binding package embodying this method 200.

At 204, the computer receives an attribute class that is created for an atomic class to which the non-atomic class refers to. If the non-atomic class refers to more than one atomic class, then an attribute class is created for each atomic class. In the previous example of PLAYER class, the PLAYER class refers to two atomic classes, namely, a STRING class and an INT (integer) class. Therefore, a STRING-ATTRIBUTE class is created for the STRING class and an INT-ATTRIBUTE class is created for the INT class. An embodiment of the STRING-ATTRIBUTE class is presented below:

```
//Second constructor
    public class StringAttribute extends Attribute {
```

-continued

```
        public StringAttribute(String name, boolean isRequired) {
            super(name, isRequired);
        }
//Serializer
        public String serialize(Object obj) {
            String s = (String) obj;
            return s;
        }
//De- serializer
        public Object deserialize(String s) {
            return s;
        }
}
```

The STRING-ATTRIBUTE class includes a second constructor, a serializer, and a de-serializer. In the constructor, a name is assigned to the STRING-ATTRIBUTE. A Boolean operation for deciding whether the attribute is required or not is also defined in the constructor. The serializer aids in serializing. The serializer is a JAVA serialize method that gets an object of type STRING and return the string. The de-serializer aids in de-serializing. The de-serializer is a JAVA de-serialize method that just returns the string it gets as its argument.

An embodiment of the INT-ATTRIBUTE class created for the INT class is presented below:

```
//Second constructor
public class IntegerAttribute extends Attribute {
        public IntegerAttribute(String name, boolean isRequired) {
            super(name, isRequired);
        }
//Serializer
        public String serialize(Object obj) {
            Integer i = (Integer) obj;
            String s = String.valueOf(i);
            return s;
        }
//De-serializer
        public Object deserialize(String s) {
            Integer i = Integer.valueOf(s);
            return i;
        }
}
```

The INT-ATTRIBUTE class also includes a second constructor, a serializer, and a de-serializer. In the constructor, a name is assigned to the INT-ATTRIBUTE and a Boolean operation for deciding whether the attribute is required or not is defined. The serializer is a JAVA serialize method that gets an object of type INT and returns a corresponding string. The de-serializer is a JAVA de-serialize method that takes a string and returns the corresponding integer value.

Figure 3:
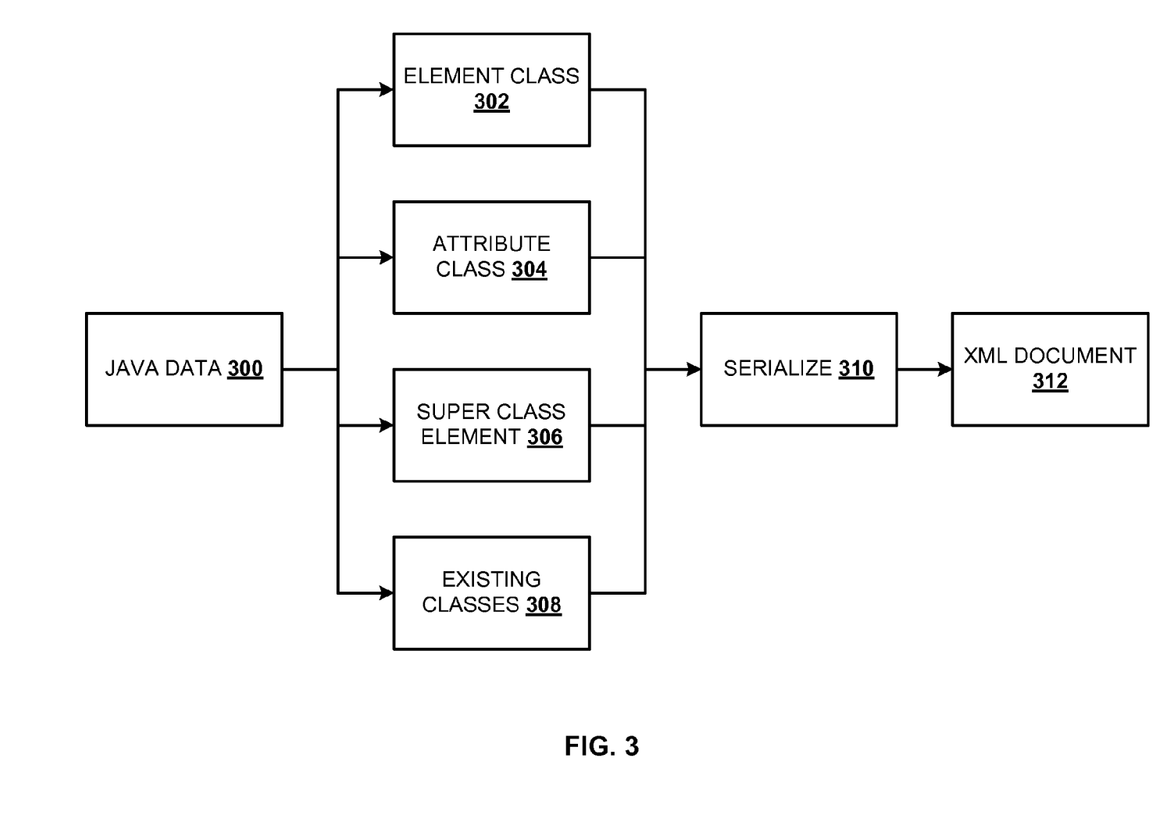
FIG. 3 is a block diagram illustrating a process for serialization according to one embodiment.

At 206, the element classes and the attribute classes are used by the computer for JAVA-to-XML data binding. The element classes and the attribute classes are used to generate an XML document as explained in reference to FIG. 3. Referring to FIG. 3, a JAVA-to-XML data binding package or API embodying this method 200 is used by a user intending to serialize a JAVA code 300. The user creates one or more element classes 302 and one or more attribute classes 304. An element class 302 is created for a non-atomic class of the JAVA data 300 and an attribute class 304 is created for an atomic class of the JAVA data 300 to which the non-atomic class refers to. If there are a plurality of non-atomic classes and atomic classes, corresponding element classes and attribute classes are created. The decomposer in the element class aids in serializing JAVA objects of type NON-ATOMIC CLASS and the serializer in the attribute class aids in serializing JAVA objects of type ATOMIC CLASS. The actual serializing code is in the super class ELEMENT 306, which is part of the JAVA-to-XML data binding package and need not be written by a user. The element class 302, the attribute class 304, the serializing code in the super class ELEMENT 306, and any existing classes 308 which are previously created or part of the JAVA-to-XML data binding package are used to serialize 310 the JAVA data 300 and generate an XML document 312. In one embodiment, the JAVA-to-XML data binding package provides a user interface (not shown) using which a user can create the element classes and attribute classes, select existing classes, and select an option to generate the XML document.

An example using test data about how the created classes can be used is presented below:

```
public class WmDemo {
        public static void main(String[ ] args) {
            try {
                // Create test data
                Player klose =
                        new Player(
                        "Miroslav", "Klose", 32,
                        new Participation[ ]{
                        new Participation("wm2010", 5, 4),
                        new Participation("wm2006", 7, 5),
                        new Participation("wm2002", 7, 5)});
                Player mueller =
                        new Player(
                        "Thomas", "Mueller", 20,
                        new Participation[ ]{
                        new Participation("wm2010", 6, 5)});
                Player[ ] players = new Player[ ]{klose, mueller};
                // Serializing
                File file = new File("wmdemo.xml");
                FileOutputStream fileOutputStream =
                        new FileOutputStream(file);
                ListElement playersElement =
                        new ListElement("players",
                        new PlayerElement( ));
                playersElement.serialize(
                        fileOutputStream, players, null);
                fileOutputStream.flush( );
                fileOutputStream.close( );
                // De-serializing
                File file1 = new File("wmdemo.xml");
                FileInputStream fileInputStream =
                        new FileInputStream(file1);
                ListElement playersElement1 =
                        new ListElement("players",
                        new PlayerElement( ));
                Object obj =
                        playersElement1.-
                        deserialize(fileInputStream);
                Object[ ] playerObjs = (Object[ ]) obj;
                Player[ ] players1 = new Player[playerObjs.length];
                for (int i = 0; i < playerObjs.length; i++) {
                        playersl[i] = (Player) playerObjs[i];
                }
                fileInputStream.close( );
            } catch (Exception e) {
                e.printStackTrace( );
            }
        }
}
```

In the above example, a test data of two football players "Miroslav Klose" and "Thomas Mueller" is created. Then in the serializing code, a list element "PLAYERSELEMENT" is created. The PLAYER-ELEMENT class, PARTICIPANT-ELEMENT class, STRING-ATTRIBUTE class, and INT-ATTRIBUTE class are then used to serialize the two football players to XML. The XML output after serialization is presented below:

```xml
<?xml version="1.0" encoding="UTF-8"?>
<players>
 <player>
   <name first="Miroslav" last="Klose"/>
    <age value="32"/>
     <participations>
      <participation tournament="wm2010" matches="5" goals="4"/>
      <participation tournament="wm2006" matches="7" goals="5"/>
      <participation tournament="wm2002" matches="7" goals="5"/>
     </participations>
 </player>
 <player>
   <name first="Thomas" last="Mueller"/>
    <age value="20"/>
     <participations>
      <participation tournament="wm2010" matches="6" goals="5"/>
     </participations>
 </player>
</players>
```

Compared to the some of the existing XML data binding techniques, the data binding technique described above obviates the need to learn XML Schema or XML Schema-based Java annotations. It is also unnecessary to follow the complicated process of compilation steps from XML Schema to a number of JAVA classes as in the case of some existing XML data binding approaches. A user needs to write only a template-like JAVA glue code (element classes and attribute classes) to serialize JAVA data. This enables the late addition of data binding to existing JAVA projects. As can be seen from close similarities between the PLAYER-ELEMENT class and the PARTICIPATION-ELEMENT class, an element class is a template-like JAVA glue code. An element class template can be defined as a template including a constructor, a decomposer, and a composer. The constructor code creates an element with one or more sub-elements and one or more attributes for the element. The decomposer code gets an object of type element and an entity and returns the data extracted from the object for the given entity. The composer code gets a mapping of entities to objects after parsing the XML document and then extracts the values of the entities and creates a corresponding JAVA object. Similarly, an attribute class is also a template-like JAVA glue code. The attribute class template can be defined as a template including a simple constructor for assigning a name and defining a Boolean operation, a serializer which is a simple JAVA serialize method, and a de-serializer which is a simple JAVA de-serialize method. The element classes and attribute classes once created for a project can be reused for any other new or existing projects.

Figure 4:
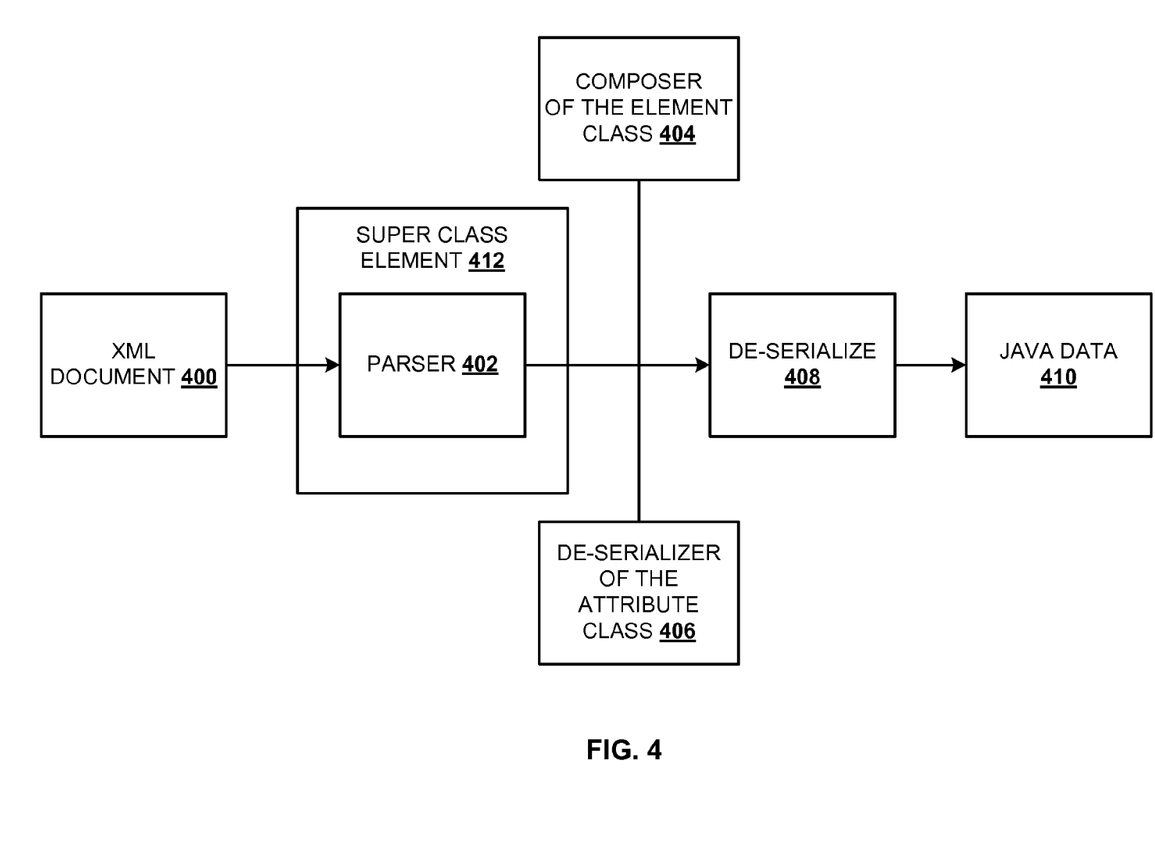
FIG. 4 is a block diagram illustrating a process for de-serialization according to one embodiment.

Referring to FIG. 4, to de-serialize an XML document 400, the XML document 400 is first parsed using an XML parser 402. The XML document 400 has reference to objects of JAVA data that is previously serialized. Any state-of-the-art XML parser can be used. In one embodiment, a StAX parser is used for parsing the XML document 400. The composer of the element class 404 and the de-serializer of the attribute class 406 are used to de-serialize 408 the XML document 400 into corresponding JAVA data 410. The actual de-serializing code and XML parsing are included in a JAVA-to-XML data binding package embodying this method. In one embodiment, the de-serializing code and XML parsing code are in a super class ELEMENT 412.

Although the reusable and late addition enabled XML data binding is described in reference to JAVA, it should be understood that a similar approach can be applied to other object-oriented programming languages that include atomic and non-atomic classes where an atomic class is a class that is represented by a non-nested string and a non-atomic class is a class that is represented by a nested string. Examples of some such object-oriented programming languages include Advanced Business Application Programming (ABAP), C++, etc.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
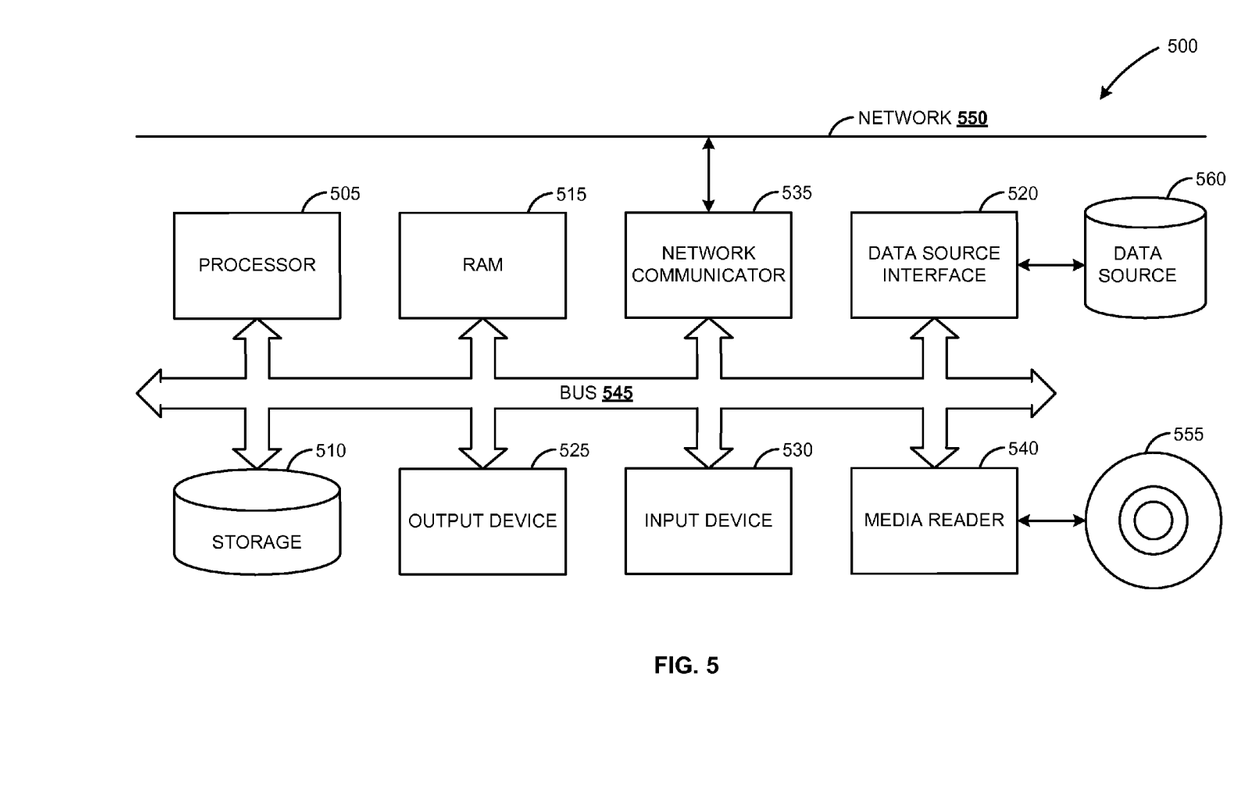
FIG. 5 is a block diagram of an exemplary computer system according to one embodiment.

FIG. 5 is a block diagram of an exemplary computer system 500. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer-implemented method for Extensible Markup Language (XML) data binding, the method comprising:
    a computer receiving an element class that is created for a non-atomic class from a program code used for creating objects to be serialized into an XML document, the element class comprising:
        a first constructor;
        a decomposer that returns data extracted from an object of the created objects in the program code, for an entity to aid in serialization, wherein the object is of type non-atomic class;
        a composer that extracts value of the entity and creates a new instance of the non-atomic class using the extracted value to aid in de-serialization; and
        wherein the element class extends a super element class, and wherein the super element class comprises serializing and de-serializing code;
    the computer receiving an attribute class that is created for an atomic class, wherein the non-atomic class refers to the atomic class, and wherein the attribute class comprises a second constructor, a serializer, and a de-serializer; and
    the computer generating the XML document using the element class, the attribute class, and serializing code in the super element class, wherein the serializing code is executed when the decomposer and the serializer are invoked.

2. The method of claim 1, wherein the non-atomic class is a class that is represented by a nested string and the atomic class is a class that is represented by a non-nested string.

3. The method of claim 1, wherein the first constructor creates the element class with one or more sub-elements and one or more attributes.

4. The method of claim 3, wherein the entity comprises at least one of an attribute or a sub-element.

5. The method of claim 1, further comprising:
    receiving an XML document having a reference to the object; and
    de-serializing the received XML document into the object.

6. An article of manufacture including a non-transitory computer readable storage medium to tangibly store instructions, which when executed by a computer, cause the computer to:
    receive an element class that is created for a non-atomic class from a program code used for creating objects to be serialized into an XML document, the element class comprising:
        a first constructor;
        a decomposer that returns data extracted from an object of the created objects in the program code, for an entity to aid in serialization, wherein the object is of type non-atomic class;
        a composer that extracts value of the entity and creates a new instance of the non-atomic class using the extracted value to aid in de-serialization; and wherein the element class extends a super element class, and wherein the super element class comprises serializing and de-serializing code;
receive an attribute class that is created for an atomic class, wherein the non-atomic class refers to the atomic class, and wherein the attribute class comprises a second constructor, a serializer, and a de-serializer; and
generate the XML document using the element class, the attribute class, and
serializing code in the super element class, wherein the serializing code is executed when the decomposer and the serializer are invoked.

7. The article of manufacture of claim 6, wherein the non-atomic class is a class that is represented by a nested string and the atomic class is a class that is represented by a non-nested string.

8. The article of manufacture of claim 6, wherein the first constructor creates the element class with one or more sub-elements and one or more attributes.

9. The article of manufacture of claim 8, wherein the entity comprises at least one of an attribute or a sub-element.

10. The article of manufacture of claim 6, further comprising instructions which when executed by the computer further causes the computer to:
receive an XML document having a reference to the object; and
de-serialize the received XML document into the object.

11. A computer system for Extensible Markup Language (XML) data binding, comprising:
a computer memory to store program code; and
a processor to execute the program code to:
receive an element class that is created for a non-atomic class from a program code used for creating objects to be serialized into an XML document, the element class comprising:
a first constructor;
a decomposer that returns data extracted from an object of the created objects in the program code, for an entity to aid in serialization, wherein the object is of type non-atomic class;
a composer that extracts value of the entity and creates a new instance of the non-atomic class using the extracted value to aid in de-serialization; and
wherein the element class extends a super element class, and wherein the super element class comprises serializing and de-serializing code;
receive an attribute class that is created for an atomic class, wherein the non-atomic class refers to the atomic class, and wherein the attribute class comprises a second constructor, a serializer, and a de-serializer; and
generate the XML document using the element class, the attribute class, and serializing code in the super element class, wherein the serializing code is executed when the decomposer and the serializer are invoked.

12. The system of claim 11, wherein the non-atomic class is a class that is represented by a nested string and the atomic class is a class that is represented by a non-nested string.

13. The system of claim 11, wherein the first constructor creates the element class with one or more sub-elements and one or more attributes.

14. The system of claim 13, wherein the entity comprises at least one of an attribute or a sub-element.

15. The system of claim 11, wherein the processor further executes the program code to:
receive an XML document having a reference to the object; and
de-serialize the received XML document into the object.

* * * * *